US007894748B2

(12) United States Patent
Su et al.

(10) Patent No.: US 7,894,748 B2
(45) Date of Patent: Feb. 22, 2011

(54) MULTI-FUNCTION PRINTER WITH A LOCKING DEVICE AND OPERATIONAL METHOD THEREOF

(75) Inventors: Chiung-Yi Su, Taipei (TW); Ming-Hung Hsu, Hsinchu (TW); Chin-Chia Liu, Taichung (TW)

(73) Assignee: Lite-On Technology Corporation, Taipei (TW)

( * ) Notice: Subject to any disclaimer, the term of this patent is extended or adjusted under 35 U.S.C. 154(b) by 1009 days.

(21) Appl. No.: 11/723,366

(22) Filed: Mar. 19, 2007

(65) Prior Publication Data

US 2008/0158589 A1 Jul. 3, 2008

(30) Foreign Application Priority Data

Dec. 28, 2006 (TW) .............................. 95223034 U

(51) Int. Cl.
G03G 21/00 (2006.01)
G03G 15/00 (2006.01)
B41J 29/00 (2006.01)

(52) U.S. Cl. .................. 399/125; 399/380; 400/693; 400/663

(58) Field of Classification Search ................. 400/663, 400/693; 399/380, 125, 367, 379
See application file for complete search history.

(56) References Cited

U.S. PATENT DOCUMENTS

| 6,510,301 | B2 * | 1/2003 | Tanaka ....................... 399/125 |
| 2007/0047028 | A1 * | 3/2007 | Hashimoto et al. .......... 358/498 |
| 2008/0310898 | A1 * | 12/2008 | Jo et al. ...................... 399/367 |

FOREIGN PATENT DOCUMENTS

| JP | 05289429 A | * | 11/1993 |
| JP | 2001175045 A | * | 6/2001 |
| JP | 2006042003 A | * | 2/2006 |

* cited by examiner

*Primary Examiner*—Daniel J Colilla
(74) *Attorney, Agent, or Firm*—Bacon & Thomas, PLLC

(57) ABSTRACT

A multi-function printer is provided. A trigger piece is fixed to the first module and stretched into a second module. A wedging piece is disposed in the second module and protruded from the second module. An actuating piece and a join piece are disposed in the second module. The actuating piece has a first end connected to the actuating piece and a second end positioned close to the trigger piece. When the three modules are stacked together, the trigger piece goes against the wedging piece and the actuating piece goes against a third module. When the first module is rotated, the trigger piece is separated from the wedging piece such that the wedging piece can be wedge with the third module. When the second module is rotated, the actuating piece drives the joint piece to wedge with the trigger piece.

20 Claims, 4 Drawing Sheets

MULTI-FUNCTION PRINTER WITH A LOCKING DEVICE AND OPERATIONAL METHOD THEREOF

This application claims the benefit of Taiwan application Serial No. 095223034, filed Dec. 28, 2006, the subject matter of which is incorporated herein by reference.

BACKGROUND OF THE INVENTION

1. Field of the Invention

The invention relates in general to a multi-function printer and operational method thereof and more particularly to a multi-function printer with a locking device and operational method thereof.

2. Description of the Related Art

A multi-function printer (MFP) includes an auto document feeder (ADF), a flat-bed scanner and a print machine. For usage convenience, the conventional multi-function printer has a number of cover lifting designs. For example, the flat-bed scanner includes a movable upper cover normally combined with a thick and heavy ADF and the user has to open the upper cover before putting a to-be-scanned document on the flat-bed. Besides, owing that the print machine is normally positioned at a lower part of the multi-function printer, the user has to open or lift up the ADF and flat-bed scanner in order to change the carbon powder or ink in the print machine. At the time, the heavy ADF covered on the flat-bed scanner will be declined along with the scanner and easily opened up relative to the scanner or even dropped down from the scanner.

However, due to consideration of small-size appearance and manufacturing cost, the present multi-function printer has no security mechanism to ensure the user's operational security and convenience. Therefore, the user may be injured or damage the multi-function printer due to his/her operation neglect. Along with the increasing requirement of a combination product with functions of a printer, scanner, fax machine and ADF, the security mechanism on the multi-function interface becomes very important.

SUMMARY OF THE INVENTION

The invention is directed to a multi-function printer with a locking device and operational method thereof. The locking device, formed by simple movement pieces, serves as a security mechanism to ensure the user's operational security and convenience and prevent the user's danger and machine damage from being occurred due to operational neglect.

According to a first aspect of the present invention, a locking device is provided. The locking device is disposed in a multi-function printer having least an ADF, a scanner and a main body. The scanner is positioned on the main body and pivotally connected to the main body, and the ADF is disposed on the scanner and pivotally connected to the scanner. The locking device includes a trigger piece, a wedging piece, an actuating piece and a joint piece. The trigger piece is fixed to the ADF and protruded into the scanner. The wedging piece is disposed in the scanner and has one end protruding under the scanner. The actuating piece is disposed in the scanner. The join piece is disposed in the scanner, and has a first end connected to the actuating piece and a second end positioned close to the trigger piece. When the ADF is set onto the scanner and the scanner is set onto the main body, the trigger piece presses against the wedging piece and the actuating piece presses against the main body. When the ADF is rotated relative to the scanner, the trigger piece is separated from the wedging piece along with the ADF such that the one end of the wedging piece is wedged with the main body and the scanner is locked to the main body. When the scanner is rotated relative to the main body, the actuating piece is separated from the main body along with the scanner and the join piece is driven by the actuating piece to wedge with the trigger piece such that the scanner is locked to the ADF.

According to a second aspect of the present invention, a multi-function printer is provided. The multi-function printer includes a first module, a second module, a trigger piece, a wedging piece, an actuating piece, a join piece and a third module. The second module is disposed under the first module and pivotally connected to the first module. The trigger piece is fixed to the first module and protruded into the second module. The wedging piece is disposed in the second module and has one end protruding under the second module. The actuating piece is disposed in the second module. The join piece is disposed in the second module and has a first end connected to the actuating piece and a second end positioned close to the trigger piece. The third module is disposed under the second module, and pivotally connected to the second module. When the first module is set onto the second module and the second module is set onto the third module, the trigger piece presses against the wedging piece and the actuating piece presses against the third module. When the first module is rotated relative to the second module, the trigger piece is separated from the wedging piece along with the first module such that the one end of the wedging piece is wedged with the third module and the second module is locked to the third module. When the second module is rotated relative to the third module, the actuating piece is separated from the third module along with the second module and the join piece is driven by the actuating piece to wedge with the trigger piece such that the second module is locked to the first module.

According to a third aspect of the present invention, a method of operating a multi-function printer is provided. The multi-function printer comprises an ADF, a scanner, a main body, a trigger piece, a wedging piece, an actuating piece and a join piece. The scanner is positioned on the main body and pivotally connected to the main body, the ADF is disposed on the scanner and pivotally connected to the scanner, the trigger piece is fixed to the ADF and protruded into the scanner, the wedging piece is disposed in the scanner and has one end protruding under the scanner, the actuating piece is disposed in the scanner, the join piece is disposed in the scanner and has a first end connected to the actuating piece and a second end positioned close to the trigger piece. The method comprises setting the scanner onto the main body and setting the ADF onto the scanner such that the trigger piece presses against the wedging piece and the actuating piece presses against the main body; rotating the ADF relative to the scanner to separate the trigger piece from the wedging piece such that the one end of the wedging piece is wedged with the main body and the scanner is locked to the main body; and rotating the scanner relative to the main body to separate the actuating piece from the main body such that the join piece is driven by the actuating piece to wedge with the trigger piece and the scanner is locked to the ADF.

The invention will become apparent from the following detailed description of the preferred but non-limiting embodiments. The following description is made with reference to the accompanying drawings.

DETAILED DESCRIPTION OF THE INVENTION

Figure 1:
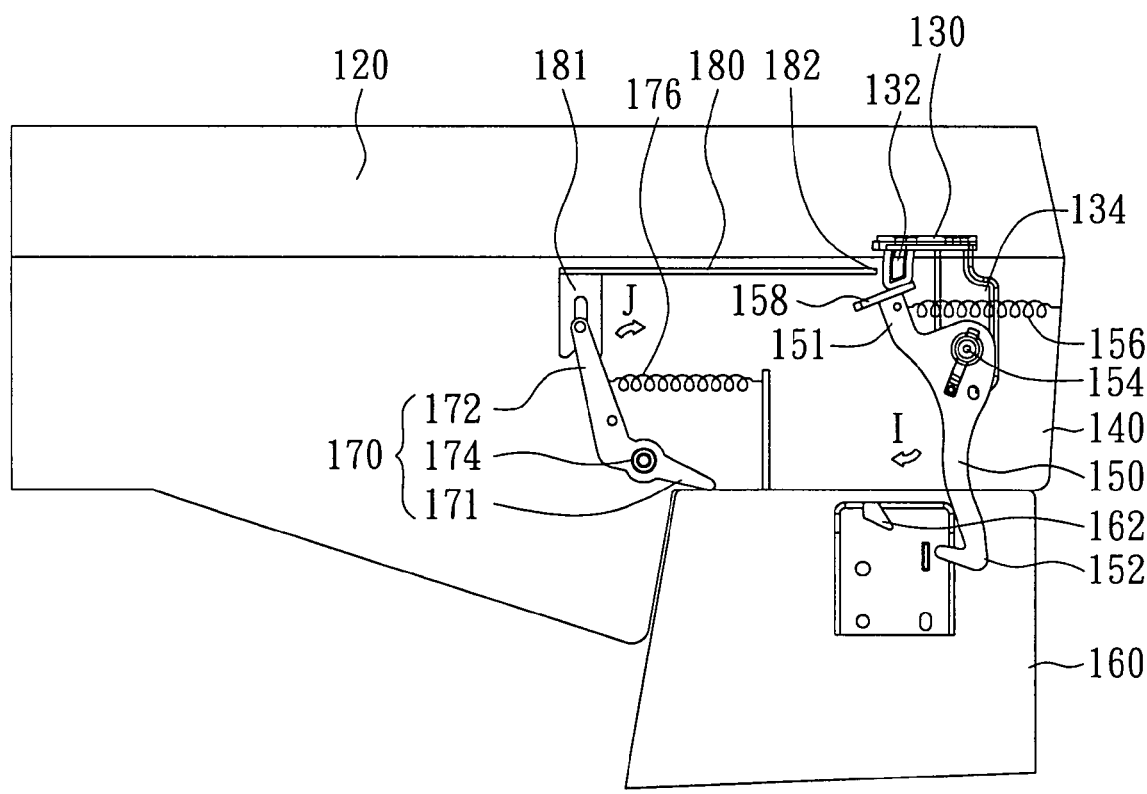
FIG. 1 is a lateral view of a multi-function printer with a first module, a second module and a third module stacked successively according to a preferred embodiment of the invention.

Referring to FIG. 1, a lateral view of a multi-function printer with a first module, a second module and a third module stacked successively according to a preferred embodiment of the invention is shown. The multi-function printer 100 of the embodiment includes a first module 120, a second module 140, a third module 160, a trigger piece 130, a wedging piece 150, an actuating piece 170 and a join piece 180. For example, the first module 120 is an ADF, the second module 140 is a scanner and the third module 160 is a main body. The second module 140 is disposed under the first module 120 and pivotally connected to the first module 120. The third module 160 is disposed under the second module 140 and pivotally connected to the second module 140. The moving pieces including the trigger piece 130, wedging piece 150, actuating piece 170 and join piece 180 have a connection relationship in accordance with the relative connection status of the first module 120, the second module 140 and the third module 160. In the following description, the status of the multi-function printer with the three modules combined together is illustrated first as shown in FIG. 1.

The trigger piece 130 is fixed to the first module 120 and protruded into the second module 140 via two openings (the openings 141 and 142 in FIG. 3) of the second module 140. Preferably, the trigger piece 130 includes a protruding part 132 and a fan-shaped bump 134. The fan-shaped bump 134 penetrates one of the two openings to protrude into the second module 140. The protruding part 132 also penetrates the other opening to protrude into the second module 140 and press against the wedging piece 150.

The wedging piece 150 is disposed in the second module 140 and has one end 152 protruding under the second module 140. The wedging piece 150 includes a pivot 154 and the two ends 151 and 152 of the wedging piece 150 can be rotated relative to the pivot 154. In details, the multi-function printer 100 further includes a spring 156 connected to the wedging piece 150 and an inner wall of the second module 140 for providing a pulling force to pull and rotate the wedging piece 150, such as in a clockwise direction. The wedging piece 150 in FIG. 1 is not rotated accordingly due to a pressing force of the protruding part 132. In additions, the wedging piece 150 preferably includes a block plate 158 disposed at the end 151 of the wedging piece 150. The block plate 158 has the same shape as the opening 141 and the protruding part 132 of the trigger piece 130 penetrates the opening 141 to press against the block plate 158 of the wedging piece 150. The end 152 of the wedging piece 150 is preferably a hook for wedging with the third module 160.

The actuating piece 170 is disposed in the second module 140 and includes a pivot 174. Two ends 171 and 172 of the actuating piece 170 can be rotated relative to the pivot 174. In details, the multi-function printer 100 further includes a spring 176 connected to the actuating piece 170 and the second module 140 for providing a pulling force to rotate the actuating piece 170, such as in a clockwise direction. In FIG. 1, the actuating piece 170 is not rotated because the end 171 of the actuating piece goes against the third module 160.

The join piece 180 is disposed in the second module 140. The join piece 180 has a first end 181 connected to the actuating piece 170 and a second end positioned close to the trigger piece 130. The first end 181 of the join piece 180 includes a slide groove, and the second end 172 of the actuating piece 170 is connected to the slide groove.

As mentioned above, when the first module 120 is set onto the second module 140 and the second module 140 is set onto the third module 160, the trigger piece 130 goes against the wedging piece 150 and the actuating piece 170 goes against the third module 160.

Figure 2:
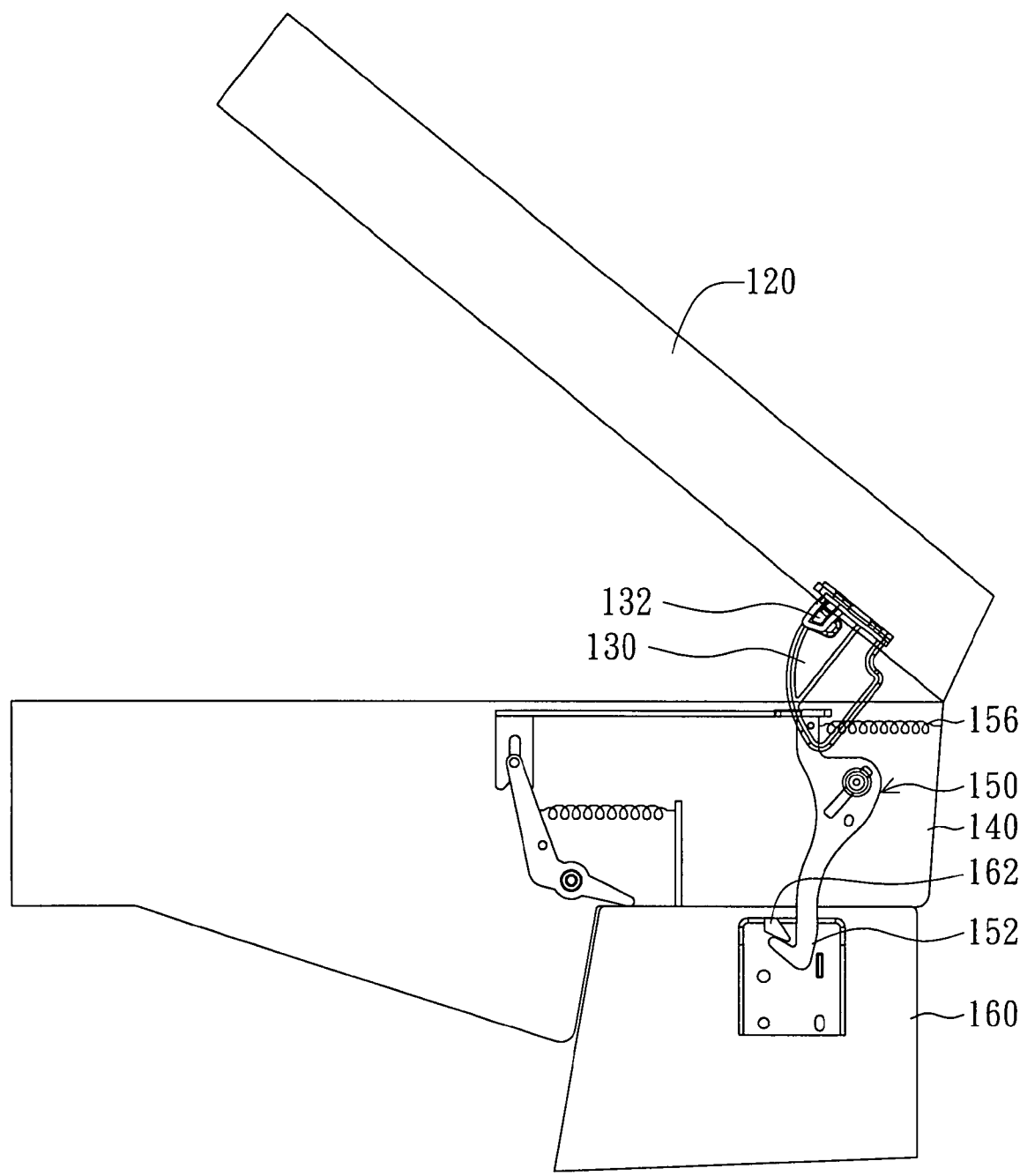
FIG. 2 is a lateral view of the multi-function printer with the first module opened relative to the second module according to the preferred embodiment of the invention.

In the process of opening the first module 120 of the embodiment, the second module 140 can be tightly wedged with the third module 160. FIG. 2 is a lateral view of the multi-function printer 100 with the first module 120 opened relative to the second module 140 according to the preferred embodiment of the invention. When the first module 120 is rotated relative to the second module 140, the trigger piece 130 is separated from the wedging piece 150 along with the first module 120. Referring to FIG. 1, the end 151 of the wedging piece 150 originally constrained by the protruding part 132 will not be constrained any more and thus the wedging piece 150 can rotate freely along the direction denoted by an arrow I (such as a clockwise direction) due to a pulling force of the spring 156. Referring to FIG. 2, the other end 152 of the wedging piece 150 after rotated clockwise is wedged with the third module 160. Preferably, the third module 160 includes a wedging part 162 for wedging with the end 152 of the wedging piece 150. By the way of wedging the wedging piece 150 of the second module 140 with the wedging part 162 of the third module 160, the second module 140 can be locked to the third module 160 in the process of opening the first module 120.

Figure 3:
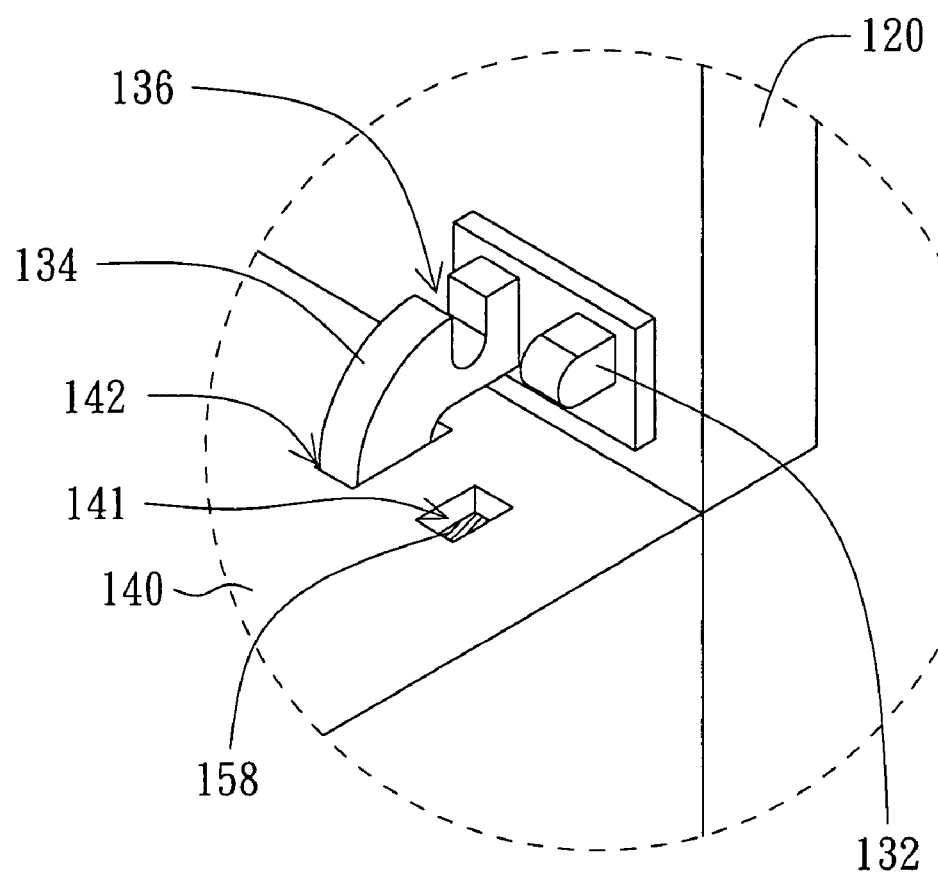
FIG. 3 is a partially enlarged body view of the multi-function printer with the first module opened relative to the second module according to the preferred embodiment of the invention.

FIG. 3 is a partially enlarged body view of the multi-function printer 100 with the first module 120 opened relative to the second module 140 according to the preferred embodiment of the invention. As mentioned above, the second module 140 has two openings 141 and 142 respectively for the protruding part 132 of the trigger piece 130 and the fan-shaped bump 134 to penetrate in. Referring to FIG. 1 and FIG. 2 at the same time, when the trigger piece 130 is rotated out of the second module 140 along with the first module 120, the block plate 158 is shifted due to a pulling force of the spring 156 to touch with a bottom of the opening 141. At the time, one part of the fan-shaped bump 134 is exposed between the first module 120 and the second module 140 and the other part of the fan-shaped bump 134 remains in the second module 140 and fills the opening 142. As a result, the outer appearance of the multi-function printer 100 has no extra holes for staples or paper clips to fall in and affect an operation of inner motors or gear sets. On the other hand, a part of the fan-shaped bump 134 remains to be positioned under the second module 140 after the first module 120 is opened, which can prevent any opening from being exposed. Moreover, the covered ADF can be prevented from damaging the document due to position limitation for placing the to-be-scanned document.

Figure 4:
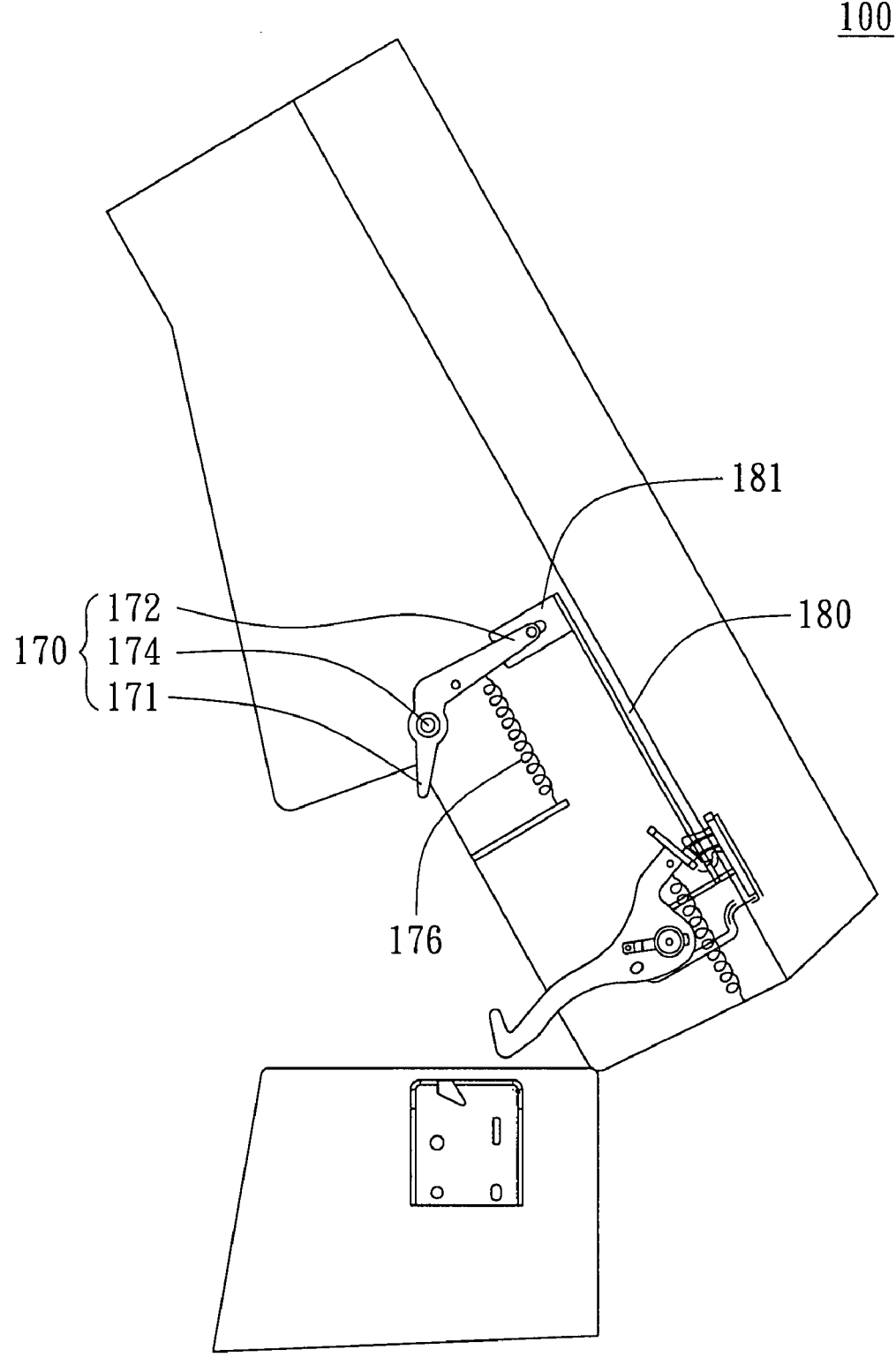
FIG. 4 is a lateral view of the multi-function printer with the second module opened relative to the third module according to the preferred embodiment of the invention.

In the process of opening the second module 140 of the embodiment, the second module 140 can be tightly wedged with the first module 120 to prevent the first module 120 from dropping down from the second module 120. FIG. 4 is a lateral view of the multi-function printer 100 with the second module 140 opened relative to the third module 160 according to the preferred embodiment of the invention. When the second module 140 is rotated relative to the third module 160, the actuating piece 170 is separated from the third module 160 along with the second module 140. Referring to FIG. 1, originally, the end 171 of the actuating piece 171 is constrained by the third module 160 due to the weight of the second module 140. Now, after the second module 140 is opened relative to the third module 160, the constrain from the third module 160 is released such that the end 171 of the actuating piece 170 can rotate freely along the direction denoted by an arrow J (such as a clockwise direction) due to a pulling force of the spring 176. Referring to FIG. 4, the end 171 of the actuating piece 170 is rotated to protrude from the second module 140 in the meanwhile the other end 172 of the actuating piece 170 is rotated to slide in a slide groove 181 of the join piece 180. Accordingly, the other end 182 of the join piece 180 is stretched into and wedged with a groove 136 of the trigger piece 130 (as shown in FIG. 3). By the way of wedging the join piece 180 of the second module 140 with the trigger piece 130 of the first module 120, the second module 140 can be locked to the first module 120 in the process of opening the second module 140.

By using the above design, during the user operation, the user security can be ensured without need of extra operational procedures. For example, when the user rotates the first module (the ADF) relative to the second module (the scanner), the wedging piece, as original constrain is released, can automatically be wedged with the third module to lock the second module with the third module. Furthermore, when the user rotates the second module (the scanner) relative to the third module (the main body), the actuating piece without constrain from the third module can automatically drive the joint piece to stretch into and wedge with the trigger piece so as to lock the second module with the first module.

The multi-function printer with a locking device and operational method thereof have the following advantages:

1. The user security can be improved in the operation of the multi-function printer. Besides, during the operation, the user can change to operate manually without need to use a switch. The two auto and manual operations can be switched automatically and sensitively without any danger.

2. The outer appearance of the multi-function printer has no extra holes for staples or paper clips to fall in and affect the operation of inner motors or gear sets. On the other hand, a part of the fan-shaped bump remains to be positioned under the second module after the first module is opened, which can prevent any opening from being exposed and the covered ADF from damaging the document due to position limitation for placing the to-be-scanned document.

3. The multi-function printer of the invention is easily fabricated due to composition of fewer components.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A locking device, disposed in a multi-function printer, the multi-function printer comprising at least an auto document feeder (ADF), a scanner and a main body, the scanner being positioned on the main body and pivotally connected to the main body, the ADF being disposed on the scanner and pivotally connected to the scanner, the locking device, comprising:
   a trigger piece, fixed to the ADF, and protruded into the scanner;
   a wedging piece, disposed in the scanner and having one end protruding under the scanner;
   an actuating piece, disposed in the scanner; and
   a join piece, disposed in the scanner, the join piece having a first end connected to the actuating piece and a second end positioned close to the trigger piece;
   wherein when the ADF is set onto the scanner and the scanner is set onto the main body, the trigger piece presses against the wedging piece and the actuating piece presses against the main body;
   when the ADF is rotated relative to the scanner, the trigger piece is separated from the wedging piece along with the ADF such that the one end of the wedging piece is wedged with the main body and the scanner is locked to the main body;
   when the scanner is rotated relative to the main body, the actuating piece is separated from the main body along with the scanner and the join piece is driven by the actuating piece to wedge with the trigger piece such that the scanner is locked to the ADF.

2. The locking device according to claim 1, wherein the wedging piece has a pivot, an other end of the wedging piece can be rotated relative to the pivot and when the trigger piece is separated from the other end of the wedging piece along with the ADF, the one end of the wedging piece is rotated to wedge with the main body.

3. The locking device according to claim 2, further comprising a spring connected to the wedging piece and an inner wall of the scanner for providing a pulling force to pull the wedging piece to wedge with the main body.

4. The locking device according to claim 1, wherein the actuating piece has a pivot, a first end and a second end of the actuating piece can be rotated relative to the pivot, the locking device comprising:
   a spring connected to the actuating piece and the scanner for providing a pulling force to pull the first end of the actuating piece to protrude from the scanner;
   when the actuating piece is separated from the main body along with the scanner, the first end of the actuating piece pulled by the spring is rotated to protrude out from the scanner and the second end of the actuating piece is rotated to drive the join piece to protrude into the trigger piece and wedge with the trigger piece.

5. The locking device according to claim 4, wherein the first end of the join piece comprises a slide groove, the second end of the actuating piece slides along the slide groove.

6. The locking device according to claim 1, wherein the scanner has an opening, the trigger piece comprises a fan-shaped bump;
   when the ADF is set onto the scanner, the fan-shaped bump of the trigger piece penetrates the opening and protrudes into the scanner;
   when the ADF is rotated relative to the scanner, one part of the fan-shaped bump is exposed between the ADF and the scanner and an other part of the fan-shaped bump remains in the scanner and fills the opening.

7. The locking device according to claim 1, wherein the scanner has an opening, the trigger piece comprises a protruding part, the wedge piece comprises a block plate disposed at the other end of the wedging piece, the block plate has the same shape as the opening;

when the ADF is set onto the scanner, the protruding part of the trigger piece penetrates the opening to press against the block plate of the wedging piece;

when the ADF is rotated relative to the scanner, the trigger piece is separated from the wedging piece along with the ADF, the block plate of the wedging piece is positioned in a bottom of the opening.

8. The locking device according to claim 1, wherein the one end of the wedging piece is a hook, the locking device comprising a wedging part disposed in the main body for wedging with the wedging piece.

9. A multi-function printer, comprising:
a first module;
a second module, disposed under the first module and pivotally connected to the first module;
a trigger piece, fixed to the first module and protruded into the second module;
a wedging piece, disposed in the second module and having one end protruding under the second module;
an actuating piece, disposed in the second module;
a join piece, disposed in the second module, the join piece having a first end connected to the actuating piece and a second end positioned close to the trigger piece; and
a third module, disposed under the second module, and pivotally connected to the second module;
wherein when the first module is set onto the second module and the second module is set onto the third module, the trigger piece presses against the wedging piece and the actuating piece presses against the third module;
when the first module is rotated relative to the second module, the trigger piece is separated from the wedging piece along with the first module such that the one end of the wedging piece is wedged with the third module and the second module is locked to the third module;
when the second module is rotated relative to the third module, the actuating piece is separated from the third module along with the second module and the join piece is driven by the actuating piece to wedge with the trigger piece such that the second module is locked to the first module.

10. The multi-function printer according to claim 9, wherein the wedging piece comprises a pivot, an other end of the wedging piece can be rotated relative to the pivot, and when the trigger piece is separated from the other end of the wedging piece along with the first module, the one end of the wedging piece is rotated to wedge with the third module.

11. The multi-function printer according to claim 10, further comprising a spring connected to the wedging piece and an inner wall of the second module for providing a pulling force to pull the wedging piece to wedge with the third module.

12. The multi-function printer according to claim 9, wherein the actuating piece has a pivot, a first end and a second end of the actuating piece can be rotated relative to the pivot, and when the actuating piece is separated from the third module along with the second module, the first end of the actuating piece is rotated to protrude out from the scanner and the second end of the actuating piece is rotated to drive the join piece to protrude into the trigger piece and wedge with the trigger piece.

13. The multi-function printer according to claim 12, further comprising a spring connected to the actuating piece and the scanner for providing a pulling force to pull the first end of the actuating piece to protrude from the second module.

14. The multi-function printer according to claim 12, wherein the first end of the join piece comprises a slide groove, the second end of the actuating piece slides along the slide groove.

15. The multi-function printer according to claim 9, wherein the second module has an opening, the trigger piece comprises a fan-shaped bump;
when the first module is set onto the second module, the fan-shaped bump of the trigger piece penetrates the opening and protrudes into the second module;
when the first module is rotated relative to the second module, one part of the fan-shaped bump is exposed between the first module and the second module and an other part of the fan-shaped bump remains in the second module and fills the opening.

16. The multi-function printer according to claim 9, wherein the second module has an opening, the trigger piece comprises a protruding part, the wedge piece comprises a block plate disposed at an other end of the wedging piece, the block plate has the same shape as the opening;
when the first module is set onto the second module, the protruding part of the trigger piece penetrates the opening to press against the block plate of the wedging piece;
when the first module is rotated relative to the second module, the trigger piece is separated from the wedging piece along with the first module, the block plate of the wedging piece is positioned in a bottom of the opening.

17. The multi-function printer according to claim 9, wherein the one end of the wedging piece is a hook, the multi-function printer comprising a wedging part disposed in the third module for wedging with the wedging piece.

18. A method of operating a multi-function printer, the multi-function printer comprising an ADF, a scanner, a main body, a trigger piece, a wedging piece, an actuating piece and a join piece, the scanner being positioned on the main body and pivotally connected to the main body, the ADF being disposed on the scanner and pivotally connected to the scanner, the trigger piece being fixed to the ADF and protruded into the scanner, the wedging piece being disposed in the scanner and having one end protruding under the scanner, the actuating piece being disposed in the scanner, the join piece being disposed in the scanner and having a first end connected to the actuating piece and a second end positioned close to the trigger piece, the method comprising:
setting the scanner onto the main body and setting the ADF onto the scanner such that the trigger piece presses against the wedging piece and the actuating piece presses against the main body;
rotating the ADF relative to the scanner to separate the trigger piece from the wedging piece such that the one end of the wedging piece is wedged with the main body and the scanner is locked to the main body; and
rotating the scanner relative to the main body to separate the actuating piece from the main body such that the join piece is driven by the actuating piece to wedge with the trigger piece and the scanner is locked to the ADF.

19. The method according to claim 18, wherein the step of rotating the scanner relative to the main body further comprises:
when the trigger piece is separated from an other end of the wedging piece along with the ADF, providing a pulling force to pull and rotate the one end of the wedging piece to wedge with the main body.

20. The method according to claim 18, wherein the step of rotating the scanner relative to the main body further comprises:

when the actuating piece is separated from the main body along with the scanner, providing a pulling force to pull a first end of the actuating piece to protrude from the scanner and rotate a second end of the actuating piece to drive the join piece to protrude into the trigger piece and wedge with the trigger piece.

* * * * *